Patented Mar. 24, 1953

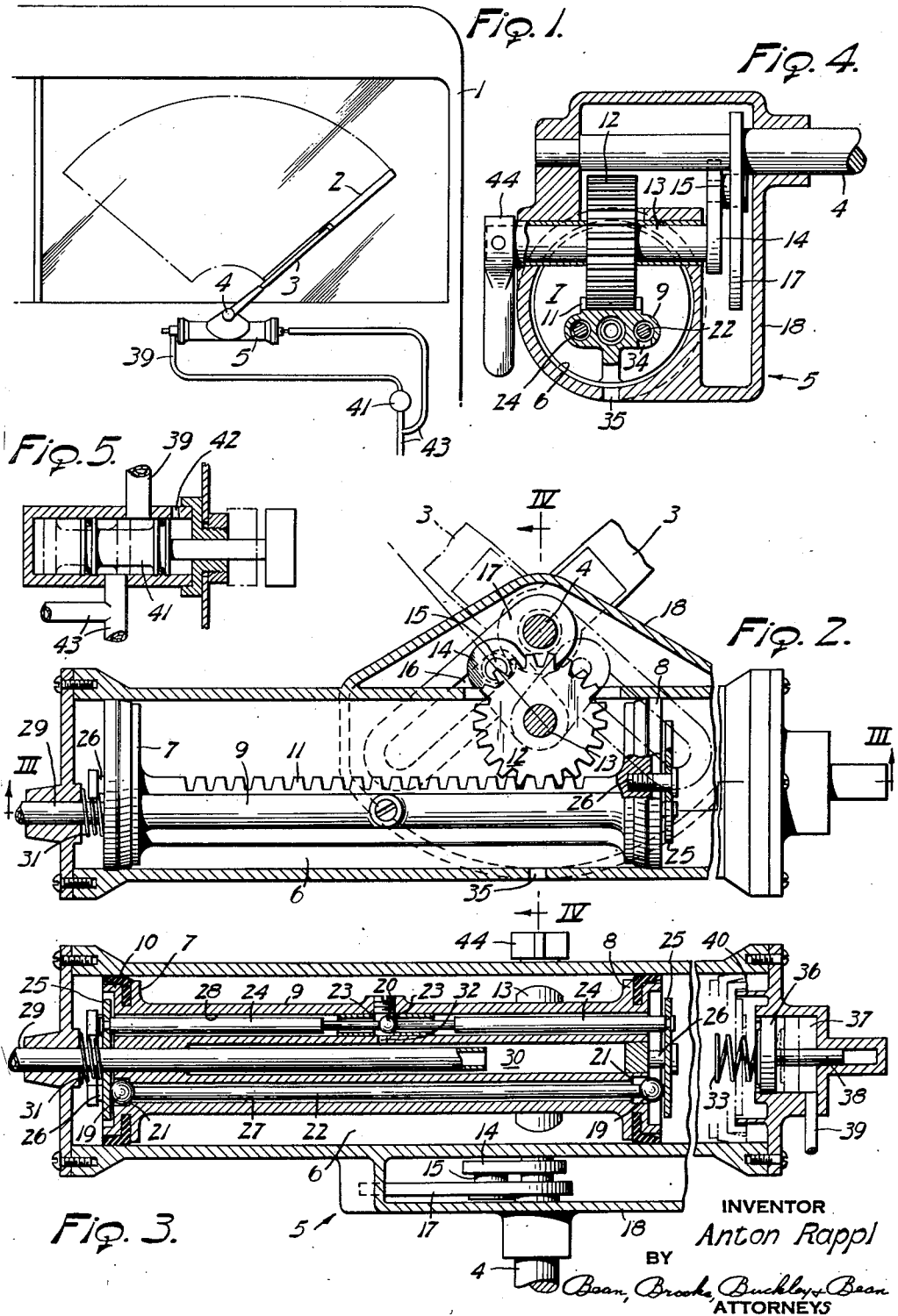

2,632,196

UNITED STATES PATENT OFFICE 2,632,196

WINDSHIELD CLEANER

Anton Rappl, Eggertsville, N. Y., assignor to Trico Products Corporation, Buffalo, N. Y.

Application November 4, 1948, Serial No. 58,351

8 Claims. (Cl. 15—253)

This invention relates to the windshield cleaning art and especially to that branch thereof wherein the wiper is moved back and forth by means of a pressure actuated motor.

It has heretofore been the practice to utilize a fluid motor, either of the subatmospheric or the superatmospheric types, with means provided to arrest the wiper to one side of the normal path of operation from which position it has been possible for the wiper to move independently of the motive power.

Again in the suction operated windshield cleaner now in use the wiper has a tendency to whip or over-travel at the end of each stroke beyond the normal path of operation and strike against the windshield frame with an annoying sound. This is primarily due to the fact that the inertia set up in the blade will carry the moving parts along therewith to a limited extent and until the motion is finally reversed by the elastic and compressible pressure fluid.

The primary object of the present invention is to provide a windshield cleaner in which the wiper motion is controlled in a definite way for increasing the efficiency of the cleaner. Further, the invention has for its object to provide a cleaner mechanism which positively secures the arrested wiper against unauthorized movement. The invention will also be found to reside in improved wiper operating mechanism which checks the wiper against uncontrolled motion and thereby insures better performance.

The foregoing and other objects will manifest themselves as the following description progresses, reference being therein had to the accompanying drawing, wherein:

Fig. 1 is a front elevation of a windshield equipped with a cleaner constructed in accordance with the present invention;

Fig. 2 is a longitudinal sectional view through the cleaner motor, portions being left in elevation;

Fig. 3 is a similar view about on line III—III of Fig. 2;

Fig. 4 is a transverse sectional view about on line IV—IV of Fig. 2; and,

Fig. 5 is a detailed sectional view through the control valve for the cleaner.

Referring more particularly to the drawing, the numeral 1 designates the windshield, over the surface of which is oscillated a wiper 2 which in turn is carried by an arm 3, fixed to a shaft 4 of a motor 5. Preferably, the motor is operable by a superatmospheric pressure and comprises a chamber 6 and a multi-part piston, the latter having spaced heads 7 and 8 joined by a body 9. Each head is provided with a cup packing 10, and the body 9 is formed with a longitudinally extending rack 11 which meshes with a pinion 12. This pinion is fixed on a second motor shaft 13 that fixedly carries a rocker arm 14 having a crank pin 15 extending laterally therefrom. The crank pin slidably engages in a slot 16 of an arm 17 operatively connected to the arm carrying shaft 4.

During motor operation, the rocker arm 14 is given an overall amplitude of swing approximating 270° and has its terminal positions substantially at right angles to the arm 17. In order to lengthen the wiper path, the driving rocker arm 14 may swing slightly in excess, as shown, and still accomplish the locking of the transmission against transmitting power from the wiper arm. This will also permit the two shafts being brought closer together. This swinging movement is imparted to the arm by the back and forth movement of the piston within the chamber 6 through reverse applications of the fluid pressure differential thereto, at which time the rack 11 rotates the pinion 12 and causes the crank pin 15 to ride in the slot 16 to oscillate the wiper carrying arm 3 accordingly. By reason of the fact that the driving crank arm 14 is normal to the driven arm slot 16 in either terminal position it will become apparent that any external force applied to the wiper arm will be incapable of camming upon the driving crank arm and angularly displacing it. The transmission between the two shafts therefore provides a lock to withstand or check the over-travel of the wiper arm at the end of its stroke.

The tendency to over-ride or whip at the end of each stroke is frustrated in a positive and definite manner and without any reactionary effect being transmitted to the piston which might tend to carry the piston beyond its normal path of movement. Any force originating in the arm will be incapable of moving the arm from its arrested position. The two arms 14 and 17 are housed within a separate chamber 18 to afford proper and ample journal bearing support for the two shafts, as will become clear from Fig. 4.

The valve action for reversing the fluid pressure applications to the piston comprises a pair of outlet valves 19 and an inlet valve 20, all carried by the piston. The piston has two through-passages, one an exhaust passage and providing seats 21 at its opposite ends for the outlet valves 19, a spacer rod 22 being interposed between the two valves to cause one valve to unseat when the other is seated, and the other through-passage serving as an inlet passage and containing the single inlet valve 20 for alternate engagement with its two seats 23, by means of a pair of opposed rods 24. These rods 24 are carried by shift plates 25 slidably supported on the opposite ends of the piston by means of one or more studs 26. These plates overlie the outlet valves 19 and act to retain them in place as well as to move them to their respective seats as will presently appear.

Pressure is supplied through a pipe 29 to an internal chamber 30 in the piston body 9, and this pressure pipe is fixed in the motor chamber 6 while the piston slides back and forth thereon. An abutment spring 31 on the pressure pipe is adapted to be compressed by the piston against the adjacent end wall of the motor chamber as the piston moves toward the left in Fig. 3, until sufficient energy is stored up in the spring to overcome the pressure holding the right hand outlet valve 19 and the single inlet valve 20 on their seats, whereupon such energy will expend itself in moving the left hand shift plate 25 to the right to seat the left outlet valve 19 and shift the inlet valve 20 across to its right hand seat. The pressure in the internal chamber 30 will now enter the inlet through-passage 28 through a port 32 and enter the left end of the motor chamber 6 to build up the fluid pressure therein sufficiently to move the piston toward the right. As the piston approaches the right hand limit of travel, it will compress a second abutment spring 33 to effect movement of the right shift plate 25 for reversing the valve positions in order to admit the fluid pressure to the right end of the motor chamber. During operation, the air in advance of the moving piston will exhaust through the outlet through-passage 27 and the vent ports 34 and 35.

For parking the wiper when the motor is arrested, the coil spring 33 is retracted against effecting pressure reversal, this being accomplished by mounting the spring upon a retractable support 36. Such support is in the form of an auxiliary piston slidable in a chamber 37 and guided by a stem 38. A branch pressure supply pipe 39 communicates with the chamber 37 normally for supplying sufficient pressure to hold the piston 36 and its spring 33 projected into the path of the motor piston for valve manipulation. However, when the windshield cleaner is inoperative, the fluid pressure supply is cut off from the chamber 37 to permit the spring 33 to recede under the piston imparted urge by reason of the constant pressure application on the opposite end of the piston. The parking position of the piston is substantially that of the normal limit of wiper movement and is determined by a stop flange 40 with which the motor piston engages upon failure of the receding spring 33 to shift the valves. In this parked position the wiper arm is mechanically locked against movement by a force from without the vehicle.

To again start the windshield cleaner the pressure is admitted to the auxiliary chamber 37 to move the auxiliary piston 36 outwardly for compressing its spring 33 against the adjacent shift plate 25 until the valves reverse their positions, whereupon the heretofore fluid locked pistons 7, 8, 9 will move to the left.

The control valve may be of any approved design, such as that shown in Fig. 5, wherein the slide valve 41 will normally vent the auxiliary motor chamber 37 to the atmosphere through a port 42, during which parking interval the pressure will be constantly applied to the primary piston to fluid lock it. For this purpose the pressure supply line 43 connects directly to the pressure pipe 29 independently of the control valve. In the full line position of Fig. 5 the control valve is connecting the supply line to the auxiliary motor branch passage 39. A handle 44 will permit manual movement of the wiper when desired.

The foregoing description has been given in detail for clarity but not by way of limitation since the inventive principles involved are capable of assuming other physical embodiments without departing from the spirit of the invention and the scope of the appended claims.

What is claimed is:

1. A windshield cleaner comprising a wiper arm, an oscillatory shaft carrying the arm, a fluid motor having a chamber with a piston therein, a shaft operatively connected to the piston for being oscillated thereby, and transmission means operatively connecting the two shafts, said transmission means comprising a crank arm fixed on the second shaft and having a crank pin slidably engaged with the wiper arm, with the terminal positions of the crank arm being substantially normal to the wiper arm whereby to secure the latter against movement by a force originating in such wiper arm.

2. A windshield cleaner comprising a wiper arm, an oscillatory shaft carrying the arm, a fluid motor having a chamber with a piston therein, a shaft operatively connected to the piston for being oscillated thereby, and transmission means operatively connecting the two shafts, said transmission comprising a driving crank arm fixed on the second shaft and a driven crank arm fixed on the first shaft, with cam means operatively connecting the driving and driven arms, the driving crank arm approaching positions normal to the driven crank arm at the opposite ends of movement of the wiper arm to reduce the tendency of the wiper to overtravel thereat.

3. A motor for a windshield cleaner comprising an actuating arm, an oscillatory shaft carrying the same, said motor having an oscillatory shaft therein arranged parallel to said first shaft, and transmission means operatively connecting the two shafts, said transmission comprising a crank arm fixed on said second shaft and a driven crank arm fixed on the first shaft in camming relation with said first crank arm, the driving crank arm approaching positions substantially normal to the driven crank arm when the second shaft terminates its strokes and constituting a lock for securing the actuating arm against movement by a force originating therein.

4. A windshield cleaner comprising a wiper arm, an oscillatory shaft carrying the arm, a fluid motor having a chamber with a piston movable back and forth therein, a shaft operatively connected to the piston for being oscillated thereby as well as for imparting movement thereto, and transmission means operatively connecting the two shafts, said transmission comprising a driving crank arm fixed on the second shaft and a driven crank arm fixed on the first shaft, with cam means operatively connecting the driving and driven arms, and the driving arm having terminal positions substantially normal to the driven arm whereby a force originating in the wiper arm will be precluded from transmitting power from the driven arm to the driving arm through the functioning of said cam means.

5. A windshield cleaner comprising a wiper, an arm carrying the wiper for moving it back and forth, a fluid motor having a chamber with a piston therein, and transmission means operatively connecting the motor to the arm to move the wiper back and forth and including means acting to retard the movement of the wiper to its point of reversal, said motor embodying valve means automatically reversing the fluid pressure differential at the end of each stroke, said valve means including a valve reversing spring in which energy is stored by a moving part of the motor as it approaches the end of the motor stroke for subsequent expenditure in reversing the valve means, and a receding support for such spring operable to move the spring from the path of such moving motor part for arresting the retarded wiper at its normal point of reversal.

6. A windshield cleaner comprising a wiper, an arm carrying the same, an oscillatory shaft carrying the arm, a fluid motor having a chamber with a piston therein, transmission means operatively connecting the two shafts to move the wiper arm back and forth and including means acting to retard the movement of the wiper arm toward the end of each stroke, said motor embodying valve means automatically reversing the fluid pressure differential at the end of each stroke, said valve means including a valve reversing spring in which energy is stored by a moving part of the motor as it approaches the end of the motor stroke for subsequent expenditure in reversing the valve means, a receding support for the spring in the form of a pressure responsive member normally held operative by the pressure fluid, and means for removing the pressure from the receding support to cause failure of the spring to effect valve reversal when the movement of the wiper arm has reached one of its terminal positions.

7. A windshield cleaner comprising a wiper arm, a fluid motor for moving the same back and forth and including a chamber and a piston member therein, a power transmission operatively connecting the motor to the wiper arm for moving it back and forth and including means for retarding the wiper arm at the end of each stroke, valve mechanism carried by the piston member for operatively reversing the fluid pressure differential in the motor to reciprocate the driving part thereof, means supplying the motor through the valve mechanism with a constant supply of operating pressure, abutment springs in the chamber at opposite sides of the piston member for acting alternately on the valve mechanism to so reverse the fluid pressure differential, a support for one spring responsive to fluid pressure to withdraw the latter from its mechanism actuing position, and manually controlled means operable to apply fluid pressure to the support to so render the valve mechanism incapable of reversing the pressure application as the wiper arm retards to a terminal position and thereby fluid lock the wiper arm in a parked position.

8. A windshield cleaner comprising a wiper, an arm carrying the same, an oscillatory shaft carrying the arm, a fluid motor having a chamber with a piston therein, transmission means operatively connecting the motor to the shaft to move the wiper arm back and forth and including means acting to retard the movement of the wiper arm toward the end of each stroke, said motor embodying valve means automatically reversing the fluid pressure differential at the end of each stroke, said valve means including a valve reversing spring in which energy is stored by a moving part of the motor as it approaches the end of the motor stroke for subsequent expenditure in reversing the valve means, a receding support for the spring in the form of a pressure responsive member normally held operative by the pressure fluid, means for removing the pressure from the receding support to cause failure of the spring to effect valve reversal when the movement of the wiper arm has reached one of its terminal positions, and means for positively holding the wiper arm in a terminal position, said holding means being in the form of a wall fixed in one end of the motor to abut said piston after failure of said valve reversal.

ANTON RAPPL.

REFERENCES CITED

The following references are of record in the file of this patent:

UNITED STATES PATENTS

| Number | Name | Date |
|---|---|---|
| 1,352,504 | Folberth | Sept. 14, 1920 |
| 1,405,773 | Folberth | Feb. 7, 1922 |
| 1,576,381 | Van Derbeck | Mar. 9, 1926 |
| 1,834,219 | Oishei | Dec. 1, 1931 |
| 2,091,390 | Forman | Aug. 31, 1937 |
| 2,103,001 | Elans | Dec. 21, 1937 |